US012193555B2

(12) United States Patent
Pärssinen et al.

(10) Patent No.: US 12,193,555 B2
(45) Date of Patent: Jan. 14, 2025

(54) COMPOSTABLE WOOD COMPOSITE MATERIAL

(71) Applicant: Sulapac Oy, Helsinki (FI)

(72) Inventors: Antti Pärssinen, Helsinki (FI); Laura Tirkkonen-Rajasalo, Helsinki (FI); Taneli Väisänen, Helsinki (FI)

(73) Assignee: Sulapac Oy, Helsinki (FI)

( * ) Notice: Subject to any disclaimer, the term of this patent is extended or adjusted under 35 U.S.C. 154(b) by 452 days.

(21) Appl. No.: 17/272,359

(22) PCT Filed: Sep. 2, 2019

(86) PCT No.: PCT/FI2019/050621
§ 371 (c)(1),
(2) Date: Mar. 1, 2021

(87) PCT Pub. No.: WO2020/043957
PCT Pub. Date: Mar. 5, 2020

(65) Prior Publication Data
US 2022/0211160 A1 Jul. 7, 2022

(30) Foreign Application Priority Data
Sep. 1, 2018 (FI) .................................. 20185730

(51) Int. Cl.
*A45D 40/00* (2006.01)
*B32B 1/00* (2006.01)
(Continued)

(52) U.S. Cl.
CPC ............ *A45D 40/0068* (2013.01); *B32B 1/00* (2013.01); *B32B 21/02* (2013.01); *B32B 21/12* (2013.01);
(Continued)

(58) Field of Classification Search
None
See application file for complete search history.

(56) References Cited

U.S. PATENT DOCUMENTS 5,350,783 A 9/1994 Reich
6,183,814 B1 2/2001 Nangeroni et al.
(Continued)

FOREIGN PATENT DOCUMENTS

CA 1171656 A 7/1984
CN 101712804 A 5/2010
(Continued)

OTHER PUBLICATIONS

English machine translation of the description of JP-2002105898-A, obtained from ESPACENET (Year: 2002).*
(Continued)

*Primary Examiner* — Eli D. Strah
*Assistant Examiner* — Thomas J Kessler
(74) *Attorney, Agent, or Firm* — Laine IP Oy

(57) ABSTRACT

A container for cosmetic products and a method of manufacturing the same. The container, such as a jar, has a wall formed by a first layer of a compostable material which comprises in combination a biodegradable polymer which forms a continuous matrix and, mixed therein, particles of a hydrophilic material capable of swelling inside the matrix upon water absorption. The container further comprises a second layer of a compostable material which comprises a biodegradable polymer which forms a continuous matrix and which is essentially free from particles of a hydrophilic material capable of swelling inside the matrix, or contains essentially less of them than the first layer. The container is degradable in compost, disintegration of the container wall, at 58° C., occurring within 12 weeks.

26 Claims, 5 Drawing Sheets

(51) Int. Cl.
*B32B 1/02* (2006.01)
*B32B 21/02* (2006.01)
*B32B 21/12* (2006.01)
*C08L 97/02* (2006.01)
*C08L 101/12* (2006.01)
*C08L 101/16* (2006.01)

(52) U.S. Cl.
CPC ............ *C08L 97/02* (2013.01); *C08L 101/12* (2013.01); *C08L 101/16* (2013.01); *B32B 2250/02* (2013.01); *B32B 2250/03* (2013.01); *B32B 2260/025* (2013.01); *B32B 2260/046* (2013.01); *B32B 2264/062* (2013.01); *B32B 2307/7163* (2013.01); *B32B 2307/728* (2013.01); *B32B 2307/732* (2013.01); *B32B 2439/40* (2013.01)

(56) References Cited

U.S. PATENT DOCUMENTS

| | | | |
|---|---|---|---|
| 6,210,792 B1 | 4/2001 | Seethamraju et al. | |
| 6,632,863 B2 | 10/2003 | Hutchison et al. | |
| 8,722,773 B2 | 5/2014 | Hamilton et al. | |
| 2002/0108532 A1 | 8/2002 | Kesselring et al. | |
| 2002/0130439 A1 | 9/2002 | Kroner et al. | |
| 2006/0267238 A1 | 11/2006 | Wang | |
| 2006/0275563 A1 | 12/2006 | Duffy | |
| 2007/0148384 A1* | 6/2007 | Bowden ................ | B65D 65/466 428/35.7 |
| 2009/0274920 A1 | 11/2009 | Bowden et al. | |
| 2010/0143678 A1 | 6/2010 | Reilly | |
| 2010/0216909 A1 | 8/2010 | Gebert et al. | |
| 2012/0043373 A1* | 2/2012 | Babinsky ................ | B32B 29/002 493/115 |
| 2012/0097685 A1 | 4/2012 | Babinsky et al. | |
| 2013/0072599 A1* | 3/2013 | Yao ........................ | C08L 67/04 524/13 |
| 2013/0253112 A1 | 9/2013 | Boerzel et al. | |
| 2015/0217896 A1 | 8/2015 | Byun et al. | |
| 2016/0076014 A1 | 3/2016 | Medoff et al. | |
| 2017/0080597 A1 | 3/2017 | Warnes et al. | |
| 2018/0215972 A1 | 8/2018 | Yang et al. | |

FOREIGN PATENT DOCUMENTS

| | | | | |
|---|---|---|---|---|
| CN | 102744764 A | 10/2012 | | |
| CN | 103732685 A | 4/2014 | | |
| CN | 104962094 A | 10/2015 | | |
| CN | 106573712 A | 4/2017 | | |
| CN | 107932874 A | 4/2018 | | |
| EP | 0319589 A1 | 6/1989 | | |
| JP | H07119098 A | 5/1995 | | |
| JP | 2002105898 A | * | 4/2002 | |
| JP | 2002113822 A | 4/2002 | | |
| JP | 2004503415 A | 2/2004 | | |
| JP | 2009524553 A | 7/2009 | | |
| JP | 2010280152 A | 12/2010 | | |
| JP | 2011178140 A | 9/2011 | | |
| JP | 2013067681 A | 4/2013 | | |
| JP | 201782234 A | 5/2017 | | |
| WO | WO0206023 A1 | 1/2002 | | |
| WO | WO2007062265 A2 | 5/2007 | | |
| WO | WO2008026733 A1 | 3/2008 | | |
| WO | WO2009103052 A1 | 8/2009 | | |
| WO | WO2010103186 A2 | 9/2010 | | |
| WO | WO-2014184418 A1 | * | 11/2014 | ........ B29C 37/0053 |
| WO | WO2015048589 A1 | 4/2015 | | |
| WO | WO-2018087428 A1 | * | 5/2018 | ............... B27K 5/02 |

OTHER PUBLICATIONS

Kale et al: Compostability of Bioplastic Packaging Materials: An Overview. Macromolecular Bioscience, 2007, vol. 7, pp. 255-277.

* cited by examiner

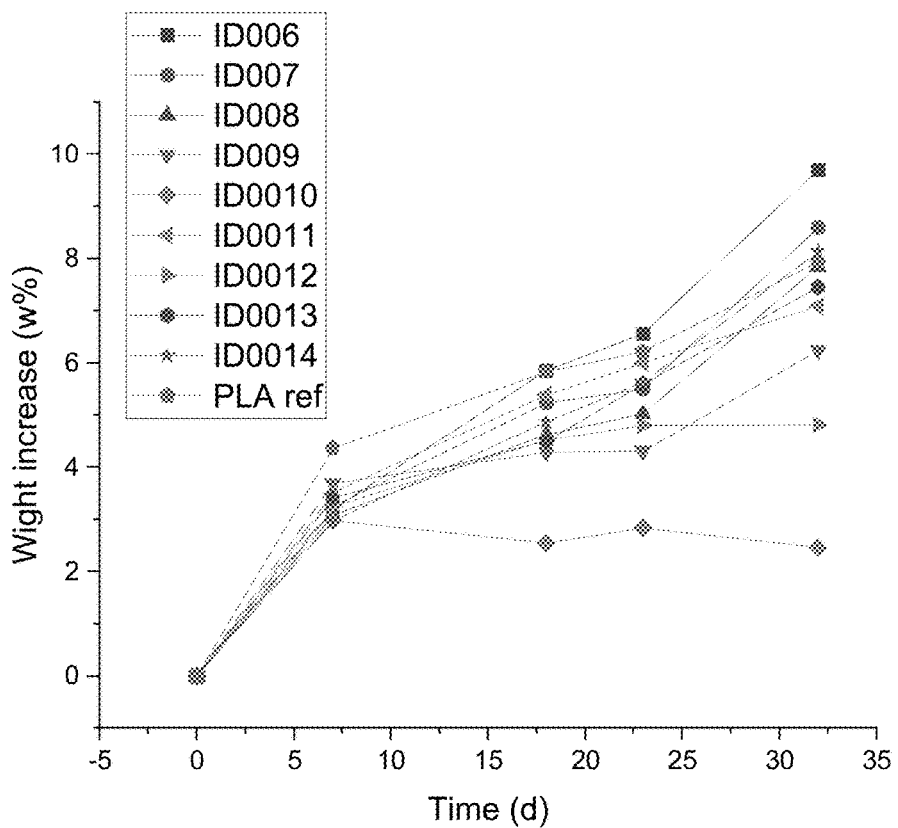

| Sample ID | Wood chip content (wt%) | Color masterbatch content (wt%) | Additive No 1 (content wt%) | Additive No 2 (content wt%) | PLA content (wt%) |
|---|---|---|---|---|---|
| ID_006 | 20 | 25 | Maleic anhydride grafted PLA (2) | Metal stearate (3) | 50 |
| ID_007 | 20 | 25 | Maleic anhydride grafted PLA (2) | Erucamide based additive (0.5) | 52.5 |
| ID_008 | 20 | 25 | - | - | 55 |
| ID_009 | 20 | 25 | Maleic anhydride grafted PLA (2) | Wax 1 (0.5) | 52.5 |
| ID_010 | 20 | 25 | Maleic anhydride grafted PLA (2) | Proprietary (0.5) | 52.5 |
| ID_011 | 20 | 25 | Maleic anhydride grafted PLA (2) | Lacquer based additive (0.5) | 52.5 |
| ID_012 | 20 | 25 | Maleic anhydride grafted PLA (2) | Proprietary (0.3) | 52.7 |
| ID_013 | 20 | 25 | Maleic anhydride grafted PLA (2) | Wax 2 (0.5) | 52.5 |
| ID_014 | 20 | - | Maleic anhydride grafted PLA (2) | Wax 2 (0.5) | 77.5 |
| PLA ref | 20 | - | - | - | 80 |

Fig. 1

Com-1　　　　　Com-2　　　　　Com-3

0 days　　　　10 days　　　　12 weeks

COMPOSTABLE WOOD COMPOSITE MATERIAL

BACKGROUND OF THE INVENTION

Field of Invention

The present invention relates to the manufacturing of three dimensionally formed compostable composite articles by melt processing. In particular, the present invention concerns the use of compositions comprising a continuous matrix of a thermoplastic biodegradable polymer and wood particles distributed within the matrix in such methods, in particular by injection molding processing. The present invention also concerns compostable articles, such as containers and other articles for packaging.

Description of Related Art

Currently, the annual production of plastics is about 320 million tonnes and about 40% of the plastic produced is used in packaging sector. It is expected that the manufacturing of plastics for packaging reaches up to 1.2 billion tonnes annually by 2050. Due to their low cost, light-weight and good hygienic manufacturing, plastics are commonly used for food storage. According to the recent studies, more than 50% of the plastic waste goes to landfill, which equals approximately 60-100 million tonnes annually. The member states of the EU generated about 25 million tonnes of post-consumer plastic in 2014, of which only 30% was recycled. In addition, it has been estimated that in 2010, 5 to 13 million tonnes of plastic waste ended up in the environment, especially in the oceans. (European commission: Strategy on plastics in a Circular Economy, 2016).

Various mass-production industries, e.g., food packaging sector, attempt to reduce their dependence on mineral oil based raw materials due to the scarcity of non-renewable mineral oil. This has shifted the major focus to biopolymers since they are regarded as an ecological alternative to traditional materials based on fossil resources. Industries are also focusing more on biodegradable materials due to contradictions concerning non-degradable materials. Once oil-based, non-biodegradable and single-use plastics products are discarded into the environment, they are subjected to a slow degradation into microplastics, a process which lasts for years, even for decades. As a consequence, enormous amounts of discarded packaging are excluded from recycling. In light of the environmental problems associated with plastics, the management of plastic waste is an important issue needing serious consideration. It is therefore a necessity to develop biodegradable materials that can be composted and biodegraded in an environmentally friendly manner over a relatively short period. In this framework, bio-based polymers play an important role since they can help reduce emissions of toxic and greenhouse gases (GHGs), such as carbon dioxide ($CO_2$).

Examples of biodegradable polymers used in packaging include starch, cellulose, chitosan, polylactic acid (PLA), polycaprolactone (PCL), polyhydroxybutyrate (PHB), polybutylene adipate terephthalate (PBAT), polybutylene succinate (PBS) and blends of them. Some of the materials can be mixtures or blends containing synthetic components, such as other polymers or additives, to improve the functional properties of the finished product and to expand the range of their applications. A recent market data report on bioplastics shows that the production of PLA is the largest segment by type with a market share of approximately 40%.

PLA is an example of a biodegradable synthetic thermoplastic polyester derived from renewable resources, such as sugar from sugarcane and maize and other plants, and is currently one of the most commonly used bioplastics. PLA is also quite durable and rigid, and it possesses good processing properties for most applications. PLA does not degrade fast in low temperature and humidity, but when exposed to high humidity and elevated temperatures (>60° C.), it will be rapidly decomposed. The biodegradation of PLA is a two-stage process consisting of hydrolysis to low molecular weight oligomers, followed by complete digestion by microorganisms. The applications of PLA range from food sector to biomedicine but are limited due to the high price of the polymer and low degradation speed in the nature.

To fulfil the requirements for European standards of compostability according to EN 13432, commercially available products made from biodegradable polymers and natural fillers are often limited to thin-walled applications, such as films and food serving utensils and containers. Most of them are manufactured from the following type of materials, for which the feasible wall thicknesses for composting are as follows: PLA-based Bio-Flex® is compostable up to 140 µm, Ecovio® up to 1.1 mm, Corbion PLA up to 1.0 mm, PHA-based Mirel® up to 0.7 mm, starch and vinylalcohol copolymers based Mater-bi® up to 1.0 mm, starch and PLA-based Inzea® up to 1.5 mm and polycaprolactone CAPA® series 1.0 mm (Tüv Austria, OK compost certified Products; 2016, in the following referred to as "OK compost" approved). A rigid packaging made from PLA blend Ecovio T® (BASF) has a maximum thickness of 1.2 mm.

In previous studies, PLA deli containers were fully degraded in 30 days. However, in case of PLA bottles, some residues of PLA were found even after 30 days of composting, where the maximum temperature elevated to over 60° C. (Kale et al. 2007). It has been shown that the biodegradation time of PLA products is highly dependent on the wall thicknesses of the articles.

Due to the thickness limitations mentioned above, OK compost approved materials of the above kind cannot be used for the storage of, e.g., liquid food products that require 90 days of shelf-life or cosmetic products requiring at least 12 months of shelf-life. These materials manage to maintain their properties at dry conditions for relatively long periods before use but they leak and start to degrade in less than a month when placed in a direct contact with liquids.

Recently, the development of biodegradable and compostable materials has been focusing on renewable sources, such as bio-based and biodegradable polymers and natural fibers from forest industry residues and by-products from, e.g., coffee, cosmetic and grain-based ethanol industries. Additionally, fibers from agriculture (such as wheat straw) and lignin containing materials such as hemp stalks can be utilized as fillers.

U.S. Pat. No. 8,722,773 concerns polymeric composite materials including 65 to 90 wt % of chemical wood pulp fiber from a chemical wood pulp sheet uniformly dispersed within a thermoplastic polymer matrix. The polymer and chemical wood pulp were mixed and processed by melt processing. U.S. Pat. No. 8,722,773 discloses a material using kraft bleached chemical wood pulp to avoid discoloration and odor problems associated with natural fibers like kenaf and wood fibers due to the lignin and other compounds present in such materials. However, for the production of composite materials, natural fibers are more inexpensive and thus more attractive materials than highly refined and bleached fibers described, e.g., in U.S. Pat. No. 8,722,773.

Composite materials containing wood particles are disclosed in JP Published Patent Application No. 2002113822. The publication suggests a layered structure having a base layer with a thickness from 1 to 30 mm and containing less than 50 wt % wood particles with a diameter from 1 to 30 mm, and a surface layer covering the base layer and containing wood particles having a diameter from 50 to 300 µm. The thickness of the surface layer is selected so that it is sufficient to conceal the base layer. No specific use for the material is suggested in the publication. Additionally, the two-layered structure described in JP 2002113822 requires the use of wood particles derived from at least two different sources, two different polymer blends as well as a manufacturing process based on co-extrusion.

The publications mentioned above disclose polymeric materials based on processing of fossil-based raw materials, such as polystyrene, polyacrylates, polyesters, polyamides, poly(ether imides) and acrylonitrile butadiene styrene-type copolymers.

Compositions of a compostable polymer, PLA, and micro-ground cellulosic material are disclosed in WO 2015/048589. The publication describes an annealed PLA composite containing PLA and up to 30% of micro-ground cellulosic material, such as micro-ground paper of paper pulp. The particle size of the micro-ground being 10 to 250 µm, in particular 20 to 50 µm with a narrow size distribution. According to the publication, the material is compostable and exhibits a high heat deflection temperature (HDT). However, it appears that no mechanical benefits are gained by the addition of the micro-ground material, and the maximum loading of the material was limited to 30% to avoid problems during processing and injection molding.

More composite materials are described in CN 101712804 A, US 2013253112, US 2016076014, US 2002130439 and EP 0 319 589.

Wood-based composites are widely used in various applications since they are environmentally friendly, light-weight and relatively low cost materials. There are numerous examples of wood-based composites and they are typically created by binding the strands, fibers or boards of wood together using some type of binder. Products of such type are also known as man-made wood, manufactured boards or engineered wood. The term wood-plastic composite (WPC) is used for materials containing wood fibers and thermoplastics, such as polyethylene (PE). Similar type of composites can also be produced from vegetable fibers. The use of additives in these materials is also common since they enable the coupling between biopolymer and natural fiber and provide benefits in processing. One of the most advantageous features of WPCs is that wood waste materials can be used in their formulations, which decreases the need to destroy old-growth forests.

Plywood is considered the first wood composite product. Plywood is manufactured from sheets of cross-laminated veneer plies, which are eventually bonded with moisture-resistant adhesives under heat. Another example of wood-composites is fiberboard, which is produced by combining wood fibers with waxes and a resin binder under high temperatures and pressure. Particle board is manufactured from wood chips or sawmill shavings pressed with a synthetic resin (US 2018215972A1).

The wood used in WPCs is ground, screened and dried prior extrusion. For decking and fence profiles, where a rough surface texture is acceptable or even desirable, screening the wood fiber to 40-60 mesh results in good flow characteristics and ease of mixing into the polymer matrix. For profiles requiring a smooth finish, the wood is sieved through 80 to 100 mesh screens. Fines that pass through a 120 mesh screen are not desirable due to poor flow properties and heterogeneous distribution in the polymer matrix during extrusion. Heterogeneously distributed wood fibers, so called "wood spots", are a common quality problem especially when wood contains excessive fines or when the extruders is too worn to achieve a homogeneous mixture (CN 107932874A).

WPCs have already gained a solid reputation in extrusion for, e.g., decking and fencing boards. Currently, the development is moving towards injection molding (IM), which is a more demanding manufacturing technique than extrusion.

A number of challenges are encountered during IM of WPCs, including unreliable quality and supply, and generally a greater difficulty in processing of WPCs when compared with more familiar IM materials, such as PE. The most commonly used raw material type for IM is pellets or granulates that contain the mixture of wood and polymer. The pellets or granulates are fed into the hopper of the IM device. The problems associated with the feeding of pellets are pellet size and moisture content of the material. When the pellets are physically too large, they have a tendency to melt unevenly and create additional friction, resulting in a structurally inferior final product (JP 2010280152, US 20060267238A1, U.S. Pat. Nos. 6,210,792B1, 6,632,863B2). Dryness of the material is also an important quality parameter. Moisture levels in WPCs will increase along with the amount of wood filler in the composite. While both extruding and IM require low moisture content for best results, recommended moisture levels are slightly lower for IM (CA 1171656A).

The IM of WPCs faces also a number of chemical challenges. The first problem associated with WPCs is that there is a need to create a strong chemical bond between the hydrophilic wood fibers and hydrophobic polymer matrix. The volume of the wood filler is moisture dependent but the volume of the plastic matrix on the other hand is temperature dependent. This results in internal shear stress and can cause cracks in the final product. Cracks do not only worsen the mechanical properties of the material but they also increase the exposed surface area of wood fibers to moisture, increasing the risk for rot and accelerated decay. In order to overcome these problems, coupling agents are used. The purpose of coupling agents is to improve the adhesion between the wood filler and the matrix. Coupling agents also decrease the hydrophilicity of the wood filler. The hydrophilic properties of the wood filler can also be affected by different treatments of the wood filler prior to compounding. This is crucial since WPCs made using unmodified wood material lack long-term durability.

It is very important to use the right type of wood filler when producing injection molded products. It is preferred to utilize wood derived from recycled wood or sawdust. Other residues from the forest industry can also be utilized. The reasons for this are the decreased LCA values and lower costs. This type of wood needs to be both mechanically and chemically processed (WO 2015/048589). During mechanical processing, wood fibers are cut to a desirable size and shape. When chemically treated, wood is chemically modified to reduce moisture absorption and to enhance the coupling between wood fibers and polymer matrices. In short, wood needs to be processed to ensure optimal performance for the WPC. Regardless of the treatments the wood will be subjected to, it needs to be dried since moisture will weaken the coupling between wood fibers and the polymer and it will increase the risk for fungal attack and causes the material to rot.

Based on the facts presented above, there is still a need for biodegradable materials that can be shaped into containers while maintaining the stability against selected chemicals for extended periods. Simultaneously, they should be capable of passing composting tests in accordance with EN 13432 (or harmonized EN 13432: 2000) compost standard. Such products should also comply with the requirements of the EU Packaging Directive (94/62/EEC).

SUMMARY OF THE INVENTION

It is an aim of the present invention to eliminate at least a part of the disadvantages of the prior art and to provide a novel material which can be cost effectively manufactured using injection molding and is degradable in industrial composting conditions even with products having wall thicknesses of more than 1 mm, in particular more than 1.2 mm, and up to 25 mm or even more.

In developing of thick materials capable of degrading in composting environment, it is crucial that water penetrates through the structure and starts breaking up the polymer chains leading to the formation of small polymer fractions which eventually will biodegrade into $CO_2$, water, inorganic compounds and biomass and leaves no microplastics, visible contaminants or toxic residues. Traditionally, this is possible only for thin sheet type of materials having thickness less than 1 mm.

The present invention is based on the idea of combining particles of a hydrophilic material, such as coarse wood particles, with a biodegradable polyester matrix to form a first composition. It has been shown that the swelling of the hydrophilic particles, for example wood particles, such as chips, having a screened size greater than about 0.5 mm, for example greater than about 1 mm, and smaller than about 25 mm, for example 10 mm or less, for example 2.5 mm or 2 mm at the most, accelerate cracking and fragmentation of the polymer matrix.

In addition to the first composition also at least one second composition is used. That composition contains considerably much less of hydrophilic particles, or is even free from them.

Thus, the present invention provides a container having a wall formed by a first layer of a compostable material comprising in combination a biodegradable polymer, which forms a continuous matrix and, mixed therein, particles of a hydrophilic material capable of swelling inside the matrix upon water absorption, and at least one second layer of a compostable material comprising a biodegradable polymer which forms a continuous matrix and which is contains less of said particles of a hydrophilic material capable of swelling inside the matrix upon water absorption, or is essentially free from them.

A method of producing such containers comprises
  forming a first mixture comprising a biodegradable polymer which forms a continuous matrix and mixed therein particles of a hydrophilic material capable of swelling inside the matrix upon water absorption;
  forming a second mixture comprising a biodegradable polymer which forms a continuous matrix and which is contains less of particles of a hydrophilic material capable of swelling inside the matrix upon water absorption; and
  processing said first and said second mixtures by injection molding to form a container wall comprising layers of said first and said second mixtures in overlapping arrangement.

The present materials, in particular when used in the form of multi-layered walls, will achieve excellent properties of compostability in combination with good mechanical properties. Water absorption of a 45 ml jar having a wall structure containing or comprising thermoplastic, biodegradable material as disclosed above is more than 0.061 mg/(day·cm$^2$) and less than 2.0 mg/(day·cm$^2$) within a 33 day period at NTP.

More specifically, the present invention is mainly characterized by what is stated in the characterizing portion of the independent claims.

The present invention provides considerable advantages. Embodiments of the present materials meet the OK compost approval. Thus, in line with attaining an OK compost approval for a material, the materials fulfil the following specifications (requirements): in compost, the complete biodegradation of the material at 58° C. takes place within a maximum period of 6 months. Biodegradation reaches a level of 90% of the product mass. Disintegration of the product at 58° C. occurs within 12 weeks. The level of disintegration is above 90%, thus only a maximum of 10% of the residual material does not pass through a 2 mm sieve.

At the same time, with the present natural fiber particles, in particular using the coarse wood particles, such as wood chips, it is possible to produce sufficiently good mechanical, physical and chemical properties for the material to be used in the production of thick-walled packages, such as jars for cosmetic packaging. Smaller particles, such as saw dust and other powders and fibrils, do not enhance compostability via water absorption and swelling as effectively. Furthermore, large particles cause hindrances in the manufacturing process and increase the degradation rate too much which prevents proper use of the materials in thick-walled packages.

In moist conditions, moisture absorption in the wood component is combined with temperature induced movements of the polymer matrix, thus causing deformations in WPCs. The moisture related change in volume increases with the size of the hydrophilic particles, such as wood particles. This results in an increased deformation and increased inner tensions in WPC with flakes or fibers of wood materials, typically having a screened size of more than 0.5 mm, in particular 1 mm or more. Tensions created in the WPC result in micro cracks and expose the wood filler to oxygen and moisture and increase the overall surface area. This results in fungal attack and decreased tensile strength.

Wood filler that is exposed to water over a long period suffers a loss in tensile strength. The decreased tensile strength is thus not only a consequence of the cracks but also from the increase in exposed filler and the decreased tensile strength of the exposed filler. The chips or fibers are prone to degrade to smaller fractions during compounding, thus changing the size and shape thereof.

The second composition, which is preferably free from hydrophilic particles, can form a surface layer on either or both sides of a layer formed from the first composition. Such a surface layer, which typically is thin (amounting to up to 1 mm in thickness) will retard onset of degradation by water of the layer(s) formed from the first composition. When aqueous materials are contained in the container, an inner face formed by a biodegradable polymer free from or essentially free from hydrophilic particles will improve water resistance of the container wall up to, for example, 6 or 12 months. Once water starts to penetrate through an inner facing or an outer surface coating into a layer formed from the first composition, degradation will commence rapidly, as discussed above and as the below examples will show.

Next, the invention will be examined more closely with a detailed description and referring to the attached drawings.

BRIEF DESCRIPTION OF THE DRAWINGS

FIG. 1 is a graphical representation of the water absorption levels at 50° C. for Wood/PLA composites containing different additives;

FIGS. 9A to 9D are SEM micrographs of which

FIG. 9A shows a pure PLA surface,

FIG. 9B shows a PLA-wood composite containing 10 wt % wood;

FIG. 9C shows a PLA-wood composite containing 30 wt % wood; and

FIG. 9D is a SEM micrograph of a PLA-wood composite containing 40 wt % wood

EMBODIMENTS

Figures 2A, 2B, 2C:
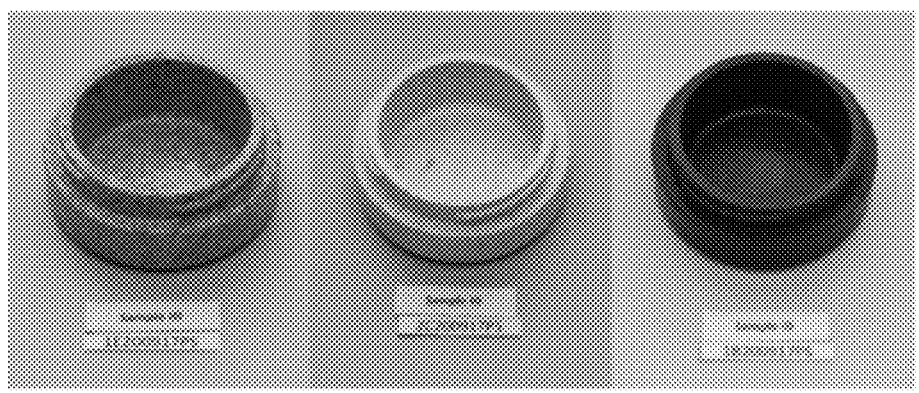
FIGS. 2A, 2B and 2C are photographs of three sample jars prior to industrial composting tests.

In the present context, the term "thick-walled" containers stands for containers having a wall with an average thickness of more than about 1 mm, in particular the wall is typically 1 mm to 25 mm.

"WPC" stands for wood-polymer-composites.

In the present context, the compositions and corresponding layers provided, having different content of hydrophilic particles capable of swelling upon water contact, are referred to in the singular tense as the "first" composition and "first" layer, and the "second" composition and "second" layer, respectively. However, it is to be understood that the present technology provides also for several first and several second compositions and corresponding layers in the same product. Typically there are 1 to 3 first layers and 1 to 5 second layers.

In one embodiment there is one (1) first layer and one (1) second layer. In another embodiment, there is one (1) first layer and two (2) second layers.

In the present context, "hydrophilic material" capable of swelling inside the matrix upon water absorption stands for typically non-fibrillated (i.e. mechanically disintegrated) natural materials which swell upon water absorption. The swelling is typically so strong that there are formed pathways in the polymer matrix which allow for penetration of water, in particular at least partially of liquid water, into the polymer matrix. This feature was already discussed above. The natural materials are typically represented by wood, plants and other vegetable materials as well as grains and parts thereof.

In one embodiment, the hydrophilic material comprises, consists of or consists essentially of particles of wood or of lignocellulosic materials or of cellulose or hemicellulose or combinations thereof.

In an embodiment, the present technology provides for a material, in particular a compostable wood composite material. Such a material can be provided in the form of a layered material, comprising a first layer of a compostable material, which comprises a biodegradable polymer which forms a continuous matrix and mixed therein particles of a hydrophilic material capable of swelling inside the matrix upon water absorption, and a second layer of a compostable material, which comprises a biodegradable polymer which forms a continuous matrix and which is free or essentially free from particles of a hydrophilic material capable of swelling inside the matrix. In an embodiment, the second layer comprises a biodegradable polymer which contains essentially less particles of a hydrophilic material capable of swelling inside the matrix than the first layer.

The present materials can be used, for example, in containers.

In an embodiment, a container for cosmetic products and similar aqueous or oleaginous products has a wall formed by at least one first layer and at least one second layer. The first layer comprises typically in combination a biodegradable polymer which forms a continuous matrix and mixed therein particles of a hydrophilic material capable of swelling inside the matrix upon water absorption. The second layer comprises a compostable material comprising a biodegradable polymer which forms a continuous matrix and which is essentially free from particles of a hydrophilic material capable of swelling inside the matrix, or contains essentially less of them than the first layer. The second layer will provide a barrier to the migration of any aqueous or oleaginous products stored in the jar into the first layer for a predetermined period of time, typically for at least 3 months, in particular 6 to 12 months, at ambient temperature, for example at about 15 to 25° C.

The particles of a hydrophilic material capable of swelling inside the matrix upon water absorption are preferably selected from particles obtained by mechanically processing of wood or other lignocellulosic materials, such as annual or perennial plants and plant residues.

In an embodiment, the particles of the hydrophilic material comprise wood particles, in particular "coarse" wood particles. Such particles typically have a screened size of more than 0.5 mm, in particular 1 mm or more, and 25 mm or less, in particular 10 mm or less, 2.5 mm or less, or 2 mm or less.

The term "screened" size is used for designating particles which are sized or segregated or which can be sized or segregated into the specific size using a screen having a mesh size corresponding to the screened size of the particles.

The container is thick-walled, i.e. it has a total wall thickness of 1 mm to 25 mm, typically about 1.2 to 10 mm.

Typically, the thickness of the first layer (or combined thickness of first layers) is greater than the thickness of the second layer or the total thickness of several second layers. In particular the ratio between the thickness of the first layer(s) to the thickness of the second layer (or combination of second layers) is about 1.1:1 to 100:1 for example 1.2:1 to 10:1.

In one embodiment, the second layer(s) have a thickness of up to 1 mm, whereas the first layer(s) have a thickness of up to 20 mm, typically up to 10 mm.

In an embodiment of the present technology, a first composition comprises a matrix of a thermoplastic polymer having a melting point greater than 110° C. and, distributed in the thermoplastic polymer matrix, hydrophilic particles of a hydrophilic material capable of swelling inside the matrix upon water absorption.

The particles of the hydrophilic material are preferably formed by non-fibrillated wood particles having a sieved size of at least 0.5 mm, or at least 1 mm, and preferably up to 25 mm, preferably up to 10 mm at the most, for example 2.5 mm or 2 mm at the most. At least a part of the wood particles is present in the form of wood chips. In particular, at least 20%, for example 30 to 90%, by volume of the wood particles are present in the form of wood chips, such chips are typically "flat-shaped", as will be discussed below.

The weight ratio of thermoplastic polymer to wood particles is typically in the range of 35:65 to 90:10, for example in the range of 50:50 to 85:15, or 55:45 to 80:20 or 60:50 to 80:20.

In a preferred embodiment, the composite comprises 5 to 60%, in particular 10 to 55%, for example 20 to 50%, or 15 to 45%, or 15 to 40%, by weight of wood particles calculated from the total weight of the thermoplastic polymer and the wood particles and any other solid components.

In an embodiment, the wood particles comprise particles having a sieved size of less than 20 mm. Thus, in one embodiment, at least 70%, preferably at least 80%, typically 80 to 95%, by weight of the wood particles have a sieved size in the range of 0.5 to 10 mm, in particular 1 to 2.5 mm, or 1 to 2 mm.

The wood particles of the composition are at least partially formed by particles having a non-cubical shape. Such particles can be characterized as being chips, such particles typically being "platy" or "slate-like" of "flat" or "flat-shaped". In an embodiment of the invention, the wood particles of the compositions are particles obtained by chipping of wood raw-material. In the present context, wood particles are considered to be wood chips when they have a generally planar structure with a cross-sectional thickness of the planes that is typically less than 40%, in particular less than 25%, for example less than 10%, of the largest dimension of the planar surface of the particles. Naturally, by chipping of wood, a finely divided particulate matter is obtained which contains wood chips or wood shavings along with particles having a variety of other shapes. The present compositions can therefore also include saw dust and wood flour (size less than 1 mm). Typically, however, a majority of the volume of the wood particles are generally chips (i.e. they have the general shape of "platy" or "slate-like" of "flat" or "flat-shaped" particles).

As discussed above, such particles, e.g. wood chips contained in embodiments of the present technology, will contribute to good dispersion of the wood material within the polymer and to good processability of the materials in polymer processing equipment. Thus, as a result relatively large wood particles, for example, with prevalent (80%) particle size between 1.0 and 2.5 mm, can be used. Further, it has been found that wood chips run smoothly through the nozzle parts of melt-processing equipment, such as injection molding devices, and do not hinder melt flow rate of the composite.

The present wood particles are typically "non-fibrillated" which signifies that they are obtained by a mechanical processing. Thus, in one embodiment, the particles of a hydrophilic material are obtained by crushing, chipping, shaving, grinding or refining of natural materials, such as wood or other lignocellulosic materials, such as annual or perennial plants and plant residues.

In one embodiment, this mechanical processing is different from one in which fibers are liberated from wood material by fibrillation, in particular fibrillation carried out by refining or grinding of chips or logs, or by pulping of wood raw-material by chemical means, such as pulping in a chemical pulping liquor. Such processing produces "fibers" or "fibrils". Nevertheless, it is possible to incorporate a portion of fibers or fibrils, in particular, fibers or fibrils derived from a lignocellulosic material, e.g., a wood material, into the present compositions in addition to the non-fibrillated wood particles. Typically, such fibrillated components form less than 50% of the total weight of the non-polymer part of the compositions. In particular, the fibrillated components form less than 40% by weight, for example less than 30% by weight, suitably less than 20% by weight, for example less than 10% or even less than 5%, by weight of the total weight of the non-polymer part of the compositions.

Suitable fibers can be obtained from lignocellulosic materials, such as annual or perennial plants or wood materials, including grass, hay, straw, bamboo, kenaf, hemp, jute, plant residues remaining following the harvest of crops, such as rice, soybeans, grass seeds.

Also crushed seed hulls of cereal grains, in particular of oat, wheat, rye and barley, and coconut shells can be employed.

The wood particles can be derived from softwood or hardwood including pine, spruce, larchwood, juniper, birch, alder, aspen, poplar, oak, maple, *eucalyptus* and mixed tropical hardwood. In a preferred embodiment, the wood material is selected from hardwood, in particular from hardwood of the *Populus* species, such as poplar or aspen or from birch. By using non-coniferous wood materials, gaseous emissions of terpenes and other volatile components, typical for coniferous wood species, can be avoided during melt-processing. Also bark which forms the outermost layers of stems and roots of woody plants is suitable organic filler material. Plants with bark include trees, woody vines, and shrubs. Also suberin-rich cork can be utilized.

A second composition comprises a matrix of a thermoplastic polymer having a melting point greater than 110° C. which forms a continuous matrix and which is essentially free from particles of a hydrophilic material capable of swelling inside the matrix, or contains essentially less of them than the first layer. In an embodiment, the second mixture contains less than 50% by weight, in particular less than 25% by weight, for example less than 10% by weight, preferably less than 5% by weight of particles of a hydrophilic material capable of swelling inside the matrix upon water absorption. Any hydrophilic material and its particles of the second layer can be selected from the hydrophilic materials and particles discussed above in connection with the first layer.

In one embodiment, the same hydrophilic material and particles are used in the first and the second layers, the difference between the first and the second layers being that the second layer contains less of the hydrophilic material. In one embodiment, the content of hydrophilic material in the second layer(s) amounts to less than 50 wt %, in particular less than 40 wt %, for example less than 30 wt %, typically less than 20 wt %, such as less than 10 wt %, of that of the first layers). In one embodiment, the second layer is free from hydrophilic natural material in particulate form, i.e. it comprises or consists essentially of or consists of a neat polymer.

Both the first and the second compositions preferably comprise a matrix of a biodegradable thermoplastic polymer. In particular, the thermoplastic polymer has melting point greater than about 150° C., in particular greater than about 155° C.

It has been found that the surface of the molded article, e.g. its smoothness and visual appearance, is dependent on dependent on the amount of water contained in the materials used for injection molding. Thus, moisture contained in the polymer can be troublesome when polymer processing temperatures approach to 200° C. because water will boil off the polymer.

Based on this, in one embodiment, before processing the amount of water ("water content") in the wood particles, for example wood chips, is adjusted to below 250 ppm, for example below 50 ppm.

In one embodiment, the biodegradable polymers used are dry or are dried before processing, e.g. before injection molding. In addition to biodegradable polymers, such as polyesters, for example of the poly(hydroxyacid) kind, also some other polymers are preferably dried before use. Examples include polyamides and polycarbonates. Thus, the water content in the thermoplastic polymer, in particular biodegradable polymer or biopolymer, such as PLA or other polyesters based on hydroxyacids, is preferably less than 500 ppm, in particular below 250 ppm, respectively. This embodiment will be examined below in more detail.

In an embodiment, the first composition and optionally also the second composition further contains mineral fillers. In a preferred embodiment, the mineral fillers are formed by slate-like particles, such as talc or kaolin. Other fillers are formed by silica. Typically, the content of mineral fillers, if any, amounts to about 0.1 to 40%, in particular about 0.5 to 30%, calculated from the total weight of the thermoplastic polymer and the wood particles.

Slate-like mineral pigments may impart improved barrier properties to the composition. The slate-like mineral pigments may also perform as processing-aids during melt processing of the compositions. Silica, i.e. finely divided silicon dioxide materials will improve melt-flow properties.

Other mineral fillers and pigments may also be present in the first and second compositions.

Typically, the total content of mineral fillers, including the slate-like mineral pigments, is less than 50% of the non-polymer part of the compositions. Examples of mineral fillers and pigments include calcium carbonate, calcium sulphate, barium sulphate, zinc sulphate, titanium dioxide, aluminium oxides, and aluminosilicates. In an embodiment, the composite further contains particles of a finely divided material capable of conferring properties of color to the composite. The dying material can for example be selected from natural materials having colors which are stable at the processing temperatures employed during melt processing. In one embodiment, the dying materials are stable at temperatures of up to 200° C.

Fatty acid metal salts can be used as a processing aid and acid scavengers. The primary functions of metallic stearates are their ability to prevent composite from sticking to the mold as well as to itself. However, for practical purposes, the commercial metallic salts are limited to those derived from stearic, palmitic, lauric, oleic, and tall oil acids. Stearic acids are straight-chained saturated, monobasic acids found in vegetable or animal fats. The two metallic stearates applicable for injection molding are calcium and zinc. The amount of used stearates amounts to 0.5-5 wt %.

In one embodiment, the wood component (wood granules) are modified chemically. The chemical modification can be carried out using a chemical reagent, typically a monomeric reagent. Among such reagents, acid anhydrides, inorganic acid esters, acid chlorides, chloroethers, aldehydes, lactones, reactive vinyl compounds, epoxides, isocyanates and metal salts of organic acids, such as metal salts of carboxylic acids, are particularly useful compounds.

One embodiment comprises using maleic anhydride having ring-anhydride group, which is capable of easily reacting with hydroxyl groups on wood matrix without reversed effect on environment and resultantly reducing amounts of hydroxyl groups. The amount of used anhydrides amounts to 1-5 wt %.

Oleic acid amides and waxes are used in injection molding as a smoothness agent and to reduce internal friction. They also may protect wood fibers from water absorption. The amount of used amides and waxes amounts to 0.1-5 wt %.

Erucamide can be used as a slip agent. The amount of used stearates amounts to 0.1-5 wt %.

Lignin as such can enhance composite material water repellent properties as well as increase mechanical durability of the composite. The amount of lignin amounts to 0.1-2 wt %.

Based on the above, in one embodiment the material of the wall of the container one or more additives, selected from the group of metal stearates, such as zinc stearate and calcium stearate, maleic anhydride grafted thermoplastics, oleamides, erucamides, fatty acids, waxes and lignins and mixtures thereof, the one or more additives being incorporated in an amount of up to 10 wt %, in particular at about 5 wt %.

Typically, the additive or additives are incorporated into a mixture of biodegradable polymer(s) and wood chips with an amount of up to 10 wt %, in particular about 5 wt % before processing of the mixture to form the container.

It is preferred that the wood particles are distributed throughout the thermoplastic polymer matrix, in particular that the wood particles are distributed uniformly throughout the thermoplastic polymer matrix. In compost the material degrades, typically thoroughly, in the presence of swelling wood chips. In one embodiment, uniform distribution means that the content of wood particles in any volume of 1 cm$^3$ of the material differs from the average content of other 10 volumes of the material having the same 1 cm$^3$ volume less than 50%. In a preferred embodiment, a composite formed from a translucent polymer and shaped into a plate having a thickness of 2.5 mm is non-translucent due to the presence of wood particles therein, in particular, when the content of the wood particles is more than 30%, in particular 40% or more, of the total weight of the wood particles and the thermoplastic polymer.

The matrix of the composite material is typically formed by a biodegradable thermoplastic polymer. In an embodiment, the thermoplastic polymer has a melting point greater than about 150° C., in particular greater than about 155° C. The thermoplastic polymer can in particular be biodegradable polymers, such as polyesters, including poly(hydroxyacid)s. Thus, the polymer can be selected from the group of biodegradable polymers comprising polylactide and poly (lactic acid), polyglycolide and poly(glycolic acid), cellulose acetate propionate, and polyhydroxyalkanoate, e.g. polyhydroxybutyrate, and mixtures thereof. Non-biodegradable polymers, such as polyolefins, polyesters, in particular biodegradable polyesters, polyamides, polyimides can also be employed for achieving composite materials filled with wood particles as herein described. The molecular weight of the biodegradable polymer should be sufficiently high to enable entanglement between polymer molecules and yet low enough to be melt processed.

In one embodiment, polylactic acid or polylactide (which both are referred to by the abbreviation "PLA") is employed. One particularly preferred embodiment comprises using PLA polymers or copolymers which have weight average molecular weights of from about 10,000 g/mol to about 600,000 g/mol, preferably below about 500,000 g/mol or about 400,000 g/mol, more preferably from about 50,000 g/mol to about 300,000 g/mol or about 30,000 g/mol to about 400,000 g/mol, and most preferably from about 100,000 g/mol to about 250,000 g/mol, or from about 50,000 g/mol to about 200,000 g/mol.

When using PLA, it is preferred that the PLA is in the semi-crystalline or partially crystalline form. To form semi-crystalline PLA, it is preferred that at least about 90 mole percent of the repeating units in the polylactide be one of either L- or D-lactide, and even more preferred at least about 95 mole percent. In another embodiment, the thermoplastic polymer has a melting point in the range of about 110 to 120° C. Such a thermoplastic can be selected from poly-butylene adipate terephthalate (also abbreviated PBAT).

The thermoplastic polymer can comprise a neat polymer either in the form of a homopolymer or a copolymer, for example a random copolymer, such as a copolyester of adipic acid, 1,4-butanediol and dimethyl terephthalate. PBAT polymers are typically biodegradable, statistical, aliphatic-aromatic copolyesters. Suitable materials are supplied by BASF under the tradename Ecoflex®. The polymer properties of the PBAT are similar to PE-LD because of its high molecular weight and its long chain-branched molecular structure.

PBAT is classified as a random copolymer due to its random structure. This also means that it cannot crystallize to any significant degree due to the wide absence of any kind of structural order. This leads to several physical properties: wide melting point, low modulus and stiffness, but high flexibility and toughness. In addition to virgin polymers, the composition may also contain recycled polymer materials, in particular recycled biodegradable polymers. Furthermore, the composition may also contain composites of polyesters, such as fiber reinforced PLA, ceramic materials and glass materials (e.g. bioglass, phosphate glass).

Based on the above, one embodiment provides a material with a first layer of a compostable material comprising a biodegradable polymer which forms a continuous matrix and mixed therein particles of a hydrophilic material capable of swelling inside the matrix upon water absorption, and at least one second layer of a compostable material comprising a biodegradable polymer which forms a continuous matrix and which is free from particles of a hydrophilic material capable of swelling inside the matrix. The biodegradable polymer of at least one of the first layer and the second and further layers is preferably selected from polylactide and poly(lactic acid), polyglycolide and poly(glycolic acid), cellulose acetate propionate, and polyhydroxyalkanoate. The material can be shaped into a product, such as a layered product, capable of forming an article or a part thereof (such as the wall of a container), said product having a thickness of more than 1 mm, in particular more than 1.2 mm, and up to 25 mm or even more, typically 50 mm or less. The layered product is degradable in industrial composting conditions.

In one embodiment, the material is used in an article for packaging, in particular in a container, such as jar with a closing lid, for various materials, including aqueous and oleaginous products.

In an embodiment, the method of producing a composite material comprises the steps of providing a thermoplastic polymer having a melting point greater than 110° C., in particular greater than 120° C., for example greater than 130° C., in particular greater than 150 or 155° C. In one embodiment, the melting point is no higher than 320° C., for example 250° C. or less, in particular 230° C. or less. Preferably, the thermoplastic polymer is a biodegradable polymer, providing non-fibrillated wood particles having a sieved size of greater than 0.5 mm, at least a part of the wood particles and melt-mixing the thermoplastic polymer with the wood particles at a mixing ratio of 35:65 to 80:20, by weight, to form a composite material melt; and cooling the melt. In one embodiment, such a thermoplastic polymer is a biodegradable polymer having a melting point greater than 110° C., in particular greater than 150 or 155° C.

It is preferred to carry out the cooling step in a mold in which the melt is shaped into an article having a predetermined shape. Typically, the thermoplastic polymer is fed in the form of finely-divided particles or pellets together with the non-fibrillated wood particles in the form of a dry mixture, into the feed zone of a melt-processing polymer processing device. The thermoplastic polymer is fed in the form of a neat polymer, as a homo- or copolymer. A further embodiment comprises the step of providing a slate-like mineral pigment, and melt-mixing the mineral pigment with the wood particles and the thermoplastic polymer, the amount of the mineral pigment being 0.1 to 40% by weight, calculated from the total weight of the thermoplastic polymer and the wood particles.

The blend or mixture comprising thermoplastic polymer, the wood particles and any slate like mineral pigment is processed by injection molding into a predetermined article. In an embodiment, the components are physically mixed and fed to the hopper of an injection molding machine having a screw mixing zone. To reduce or prevent degradation of the polymer, the components are subjected to melt mixing in the screw for a limited space of time amounting typically to less than about 10 minutes. The processing temperature is kept below the decomposition temperature of the polymer. In case of PLA, a maximum temperature of 230° C. is preferred. To reduce or prevent degradation of the polymer during processing, in a preferred embodiment a screw with an L/D ratio of at least 20:1 is used. For shaping the melt into an article of predetermined form a mold is used. The mold temperature is generally lower than the glass transition temperature of the polymer. For PLA, a temperature of about 25-60° C. is preferred, and for amorphous PLA, the preferred range is about 35-55° C. The pressure employed during injection molding is typically in the range of 50 to 150 bar, for example about 80 to 120 bar, with a back pressure in the range of 50 to 100 bar.

During melt-processing it is generally preferred to maintain the temperature below the decomposition temperature of the polymer material and of the wood components. Thus, in preferred embodiments, the material is processed at a temperature below 230° C. in particular below 220° C.

The thermal properties of the compositions can be modified and improved by the addition of mineral components. Thus, using slate-like mineral pigments, such as talc or clay, not only improved barrier properties are obtained but also improved heat resistance which allows for mixing and processing of the wood particles and the polymer without pyrolysis of the wood particles even at temperatures in excess of 200° C.

The present composites exhibit in combination properties of gas, liquid and oil barrier. Although the properties of the material as such are good, it is possible further to improve the barrier properties of the shape products by applying a barrier coating onto the surface of the melt. In particular a coating is applied onto the surface of the cooled melt, or onto a surface of an article shaped from the composite material.

The coating can produced by means of multicomponent injection molding. On common example of such methods are the 2-component (in the following also abbreviated "2K") processing methods, preferably by 2K injection molding from the very same material used in manufacturing of the container. The adhesion between the two layers manufactured of the same material is ideal and no seam can be observed. When the polymer coating layer is 0.8 mm thick, the coated container has similar water repellent properties as 100 w-% polymer.

Multicomponent injection molding can also comprise molding of 3, 4 or more components (3K, 4K etc. molding).

Based on the above, in one embodiment, a method of producing a container for cosmetic products having a wall formed by a first layer of a compostable material comprising in combination a biodegradable polymer which forms a continuous matrix and mixed therein particles of a hydrophilic material capable of swelling inside the matrix upon water absorption, and a second layer of a compostable material comprising a biodegradable polymer which forms a continuous matrix and which is contains less of the particles of a hydrophilic material capable of swelling inside the matrix upon water absorption, or is essentially free from them, comprises the steps of:

forming a first mixture comprising a biodegradable polymer which forms a continuous matrix and mixed therein particles of a hydrophilic material capable of swelling inside the matrix upon water absorption;

forming a second mixture comprising a biodegradable polymer which forms a continuous matrix and which is contains less of particles of a hydrophilic material capable of swelling inside the matrix upon water absorption; and processing the first and the second mixtures by injection molding to form a container wall comprising layers of the first and second mixtures in overlapping arrangement, for example the first and second mixtures are processed to form a multi-layered, "sandwich" type wall structure.

In a second embodiment, a method of producing a molded articles, such as a container, having a wall formed by a first layer of a compostable material comprising in combination a biodegradable polymer which forms a continuous matrix and mixed therein particles of a hydrophilic material capable of swelling inside the matrix upon water absorption, and a second layer of a compostable material comprising a biodegradable polymer which forms a continuous matrix and which is free from particles of a hydrophilic material capable of swelling inside the matrix upon water absorption, comprises the steps of:

forming a first mixture comprising a biodegradable polymer which forms a continuous matrix and mixed therein particles of a hydrophilic material capable of swelling inside the matrix upon water absorption;

forming a second mixture comprising a biodegradable polymer which forms a continuous matrix and which is contains less of particles of a hydrophilic material capable of swelling inside the matrix upon water absorption; and processing said first and said second mixtures by injection molding to form a container wall comprising layers of said first and said second mixtures in overlapping arrangement, for example the first and second mixtures are processed to form a multi-layered, "sandwich" type wall structure, wherein the biodegradable polymer of at least one of the first layer and the second layer and any further layers being selected from polylactide and poly(lactic acid), polyglycolide and poly(glycolic acid), cellulose acetate propionate, and polyhydroxyalkanoate.

The second layer(s) will provide transitory protection for the first layer from water contact to retard the onset of degradation of the wall. For example, when the second layers are composed of a thermoplastic biopolymer without any swellable wood particles, such as pure PLA, the composite first layer will not be come into contact with water until it has penetrated through the PLA layer. The length of time required for water penetration depends on the thickness of the second layer and the temperature, but typically a time of up to 12 months is possible.

It has been found that the properties of the present products are influenced by the topography of the composite material used in the articles. It has further been found that the greater the surface roughness, the higher the water absorption values for the present WPCs. This, in turn, promotes the biodegradation and increases biodegradation speed of the material. It has also been observed that the higher the wood content, the higher is the surface roughness of the WPC, which is due to higher amount of wood on the surface of the injection molded article.

Thus, in one embodiment, the second layer(s) referred to above are provided free from wood or other natural materials in polymers. By such embodiment, the biodegradation speed of the polymer component, such as PLA or another biodegradable polymer, is decreased because of the smoother surface of the pieces made from pure polymers.

In one embodiment, the surface of the second layer opposite to the first layer is smooth. In the present context, "smooth" stands for a surface which has a surface roughness (Ra) of less than 1 µm, as determined according to ISO 4287. Such container surfaces, typically formed of wood-PLA composites containing less than 30 wt % wood, are stable against water and ethanol absorption for up to 6 months.

By contrast, tests have shown that when containers formed from composites of wood-PLA with more than 30 wt % wood particles and having a Ra value of more than 1.1 µm as determined by ISO 4287, will absorb water rapidly and when they form the inner surface of the jar, they are not stable against water and ethanol absorption for 6 months.

As the below examples will show, a container having a container wall formed by a wood-PLA composite material and injection molded will fulfill the requirements of compostability (tested in an aerobic industrial compost for 12 weeks according to the frameworks given in ISO 13432) when the inner surface has a roughness of 0.4 µm or more and the outer surface has a roughness value of 2.0 µm or more, as determined according to ISO 4287.

Based on the above, in one embodiment, the surface of the second layer facing either the interior of the container or the outside of the container is free or essentially free from visible wood particles. Such a layer will ensure that Further, in one embodiment, the surface of the layer facing the interior of the container contains 10 wt % or less of wood particles.

At elevated temperature water absorption levels for the herein studied compositions making up the first layer were between 3 and 4 wt % for the first week. Water absorption differences increased dramatically during a one-month testing period. The best results from composting point view were achieved with compounds containing Zn-stearate and maleic anhydride modified PLA that improved surface quality of the molded jars.

Surface quality is highly dependent on the amount of water in the raw materials prior injection molding. The level of moisture contained in the polymer can cause problem when the polymer processing temperatures is close to 200° C. because at this temperature (100° C.), the water will boil off from the polymer. When the water boils, the vapors in the form of bubbles get trapped inside the molded part. As the molded part cools and solidifies in the mold, splay marks are created in the finished part. Also wood is a problematic material during molding process. At the injection molding temperatures between 180° C. and 220° C., the volatile organic components (VOCs) of wood, such as terpenes and their derivatives, α- and β-pinene, low molecular weight aldehydes can cause microbubbles in the produced product result in high water absorption in service. Further on, wood pyrolysis reactions cause formation of aliphatic acids like acetic acid causing corrosion of mold parts leading to decrease in surface smoothness quality.

In one embodiment, the amount of water ("water content") in the wood particles, for example wood chips, needs to be reduced to below 250 ppm, for example to below 50 ppm, in particular to below 30 ppm and the water content in PLA to below 500 ppm, in particular to below 250 ppm, respectively, before injection molding.

In one embodiment, a low moisture level in wood is achieved by drying the wood material, such as wood chips, for 4 hours at 105° C. in vacuum. In one embodiment, which can be combined with the previous, polymer granules are dried at a temperature close to, but preferably below the glass transition point, for 1 to 12 hours, for example, in a desiccant air drier. Thus, for PLA, the polymer in granular form is, for example, dried at 60° C. for 4 hours in a desiccant air drier.

Injection moulding is one of the most common processing techniques in the plastic industry. It is a fast process and is used to produce large numbers of identical three-dimensional products. A part is manufactured by injecting molten plastic into a mould and cooling it down.

Generally, injection molding of wood-PLA-composites having various contents of wood particles can be carried out as follows:

Material is fed from the hopper into the heating barrels, whose temperatures can be controlled according to the specifications of the plastic so that the material is molten. The molten material moves inside the machine because of the rotating movement of the screw, which is located in the barrel section. In addition, the screw in injection molding machine provides heat, mixes the material and maintains injection pressures. From the barrel section, molten material is transported to runner system, from which the molten plastic is injected into a cooled mold that forms the final product and cools down the material.

In one embodiment, the raw material components are after drying, for example, carried out as explained above, separately fed to the injection molding line hopper.

In one component injection molding, only one kind of material is used to produce the product. However, there are several techniques to make parts that include more than one material. Multicomponent injection molding is one example of this. In multicomponent molding, two or more materials can be used in same part. Materials are injected from two (or more) barrels into the same mold.

Wood is prone to burning at elevated temperatures, especially when combined with a polymer, such as PLA, having a melting point close to 180° C. It has been found that burning may also occur when processing wood and polymer mixtures wherein the wood raw material comprises both sieved wood chips having a size greater than 1 mm and wood flour, which typically has a sieved size of 100 micrometer or less. Shear rates in such mixtures become high and uneven and impairs the structural properties of products formed by injection molding. At the gate area, hot areas can be formed into the material, where the increased friction burns the wood and causes discoloration and degradation of the polymer component (thermoplastic material).

Thus, in one embodiment, injection molding of wood-polymer mixtures to form the present wood-plastic composites, is carried out at by avoiding the formation of hot areas within the material.

In one embodiment, injection molding is carried out by maintaining an even shear rate within the injected material.

In one embodiment, injection molding is carried out using a needle gate system.

In one embodiment, the injection mold and hot runner system are dimensionally specifically adapted to the raw material. For example for PLA pellets and wood particles having a sieved size in the range of 1 to 2 mm and with the aim of producing a thick-walled object, such as a cap for a jar having a volume of generally 5 to 25 cm$^3$, such as 12.25 cm$^3$, a preferred minimum size of the nozzle gate diameter is 2.5 mm, and the corresponding hot runner system minimum diameter is 9 mm. Such dimensions will improve the flow of the wood particles containing material through the hot runner system.

In one embodiment, the biodegradable polymer, such as PLA, is present in the amorphous state in the final product. Providing the biodegradable polymer, such as PLA, in amorphous state is beneficial for achieving fast degradation of the material. It is also beneficial due to aesthetic reasons.

In one embodiment, the mold temperature during molding of the materials is kept at a temperature below the glass transition point of the biodegradable polymer. Thus, for PLA, having $T_g$ of 60° C., the temperature is typically kept below that temperature. In one embodiment, for PLA, the mold temperature is kept between 25 and 40° C. By maintaining the temperature of the material below the glass transition point, the biodegradable material can be maintained in amorphous state.

In one embodiment, the cavity of the mold used for injection molding is filled totally during the injection phase. Preferably, the mold is filled by feeding molten polymer by injection molding in a laminar flow, in particular a laminar flow having a wide flow front, into the mold.

In one embodiment, injection molding is carried out by avoiding stream flowing (jetting).

The mold filling can be divided into fountain flow and solid flow. The fountain flow is typical for thermoplastic polymers and it is the result of the melt contacting the wall of the mold, and it occurs due to the parabolic flow front.

The skin of the plastic in contact with the cool mold freezes rapidly, while the central core remains molten. When additional material is injected, it flows into this central core, displacing the material already there, which then forms a new flow front. The flow of this displaced material is a combination of forward flow and outward flow. The outward flow contacts the wall, freezes, and forms the next section of skin while the forward flow forms the new molten core.

The frozen layer is formed by the flow front inflating, and so it is subject to only a low shear stress and, therefore, has a very low level of molecular orientation. Initially, the frozen layer is very thin, so heat is lost very rapidly.

The solid flow is typical for highly filled polymer compounds and thermosets. By this flow the melt slips on a layer of low viscosity resin. The flow front consists of less compacted melt followed by a compact melt zone. An orientation of reinforcing particles is not possible.

The additional polymer layer on wood composite material can be manufactured by using 2K injection molding technique. One of the major advantages of 2K injection molding compared to overmolding is that the polymer to be injected is still hot and has not shrunk yet. This virtually excludes the risk of burns being formed on the second component. In addition, the surface is still 'virginally' clean, enabling good molecular adhesion. Another significant advantage is the cycle time gained, the constant process and the fact that manual insertion is not required, thus avoiding the risk of damaging the first component. With 2K technique, it is possible to produce multilayer "sandwich" type structures.

Overmolding is a unique injection molding process that results in a seamless combination of multiple materials into a single part or product. The composite jar is overlaid with a thin exterior layer using either a single-shot (insert molding) and two-shot (multiple-shot molding) technique.

According to one embodiment, injection molding of the present wood-biodegradable polymer composites is carried out using the following main processing parameters:

| Processing conditions for injection molding | Throat | 40-60° C. |
|---|---|---|
| | Feed zone | 150-160° C. |
| | Compression zone | 160-170° C. |
| | Homogenizing zone | 175-190° C. |
| | Machine nozzle | 175-190° C. |
| | Back pressure | 50-100 bar |
| | Hot runner nozzle and pushing | 200-220° C. 20-25° C. |
| | $T_{mold}$, front | 40-45° C. |
| | $T_{mold}$, back | Typical settings may require optimization. Both cold and hot runner |
| | General advice | |

The present materials are suitable for producing a container, such as a rigid-walled or semi-rigid walled container for cosmetic products or foodstuff, the content can be cold or warm, typically the content can have a temperature of 0 to 100° C., for example 1 to 80° C., although the present container can also be used at subzero conditions. In an embodiment, the container can be used at −45° C. . . . −0° C., in particular at −25° C. . . . −0° C.

According to the experimental results described herein, improved properties in compostability are achieved by blending biodegradable polymers, exemplified by PLA, with natural materials.

Specific embodiments of the present invention will now be described with reference to examples. The following non-limiting examples illustrate embodiments of the present technology and should not be construed to be limiting for the scope of the invention.

EXAMPLE

Polymer and wood chips were dried at 100-105° C. for four hours in a desiccant dryer before they were fed into the hopper of the injection molding machine.

The polymer comprised PLA which contained over 99% of PLLA isomer and less than 1% of PDLA isomer. The wood chips were selected so that their physical dimensions were approximately 2 mm×1 mm×1 mm.

The water content of the raw materials was decreased to below 250 ppm to ensure that the quality of the product meets the requirements.

When in hopper, the dried materials were fed into the barrel section of the injection molding machine, where the temperatures were set to 155-185° C. The molten mixture of wood chips and polymer were then fed into the hot runner system, in which the temperatures were set to 195-210° C. Then, the material was injected into the mold, whose temperatures were set to 25-40° C. to ensure the efficient cooling. The back pressure of the machine was set to 50-100 bar.

The parts, shaped in the form of containers, manufactured were tested for compostability and other properties as will appear from the following.

The compostability of the present products was determined under practice-relevant conditions (disintegration) in an aerobic industrial compost for 12 weeks according to the frameworks given in ISO 13432 standard. The degradation of the products was assessed using the disintegration method. To investigate the compostability of the present wood composites, cosmetic jars with 7 cm diameter and 3 cm height and maximum wall thickness of 8 mm were injection molded using the following composite recipes:

TABLE 1

Recipes of wood/PLA composites used in composting tests

| Sample code | PLA (w-%) | Wood chips (w-%) | Color pigment in PLA |
|---|---|---|---|
| Com-1 | 60 | 40 | none |
| Com-2 | 55 | 40 | White (5 w-%) |
| Com-3 | 58 | 40 | Black (2 w-%) |

FIGS. 2A to 2C shows photographs of three sample jars before composting tests.

Briefly, the jars were inserted inside stainless-steel capsules with the compost material and buried into the industrial compost for 12 weeks. Changes on the samples were examined in the beginning, two times during and once after the composting period. Dry mass of the samples was measured and disintegration of the samples according to ISO 16929 was defined at the time points. Content of the capsules with disintegrated samples was sieved after the test.

According to the results, the samples disintegrated at the conditions employed in the industrial composting facility. After 17 days of composting, all nine samples were disintegrated to pieces and dry mass could not be measured. During the 12 weeks test period, all of the samples were disintegrated into pieces with a size of 1-2 mm, six control plastic samples remained unchanged. Sieving test results support the assumption that 90% disintegration of the samples to the smaller than 2 mm size of the particles, is well reachable in 12 weeks in an industrial composting environment.

Figures 3A, 3B, 3C:
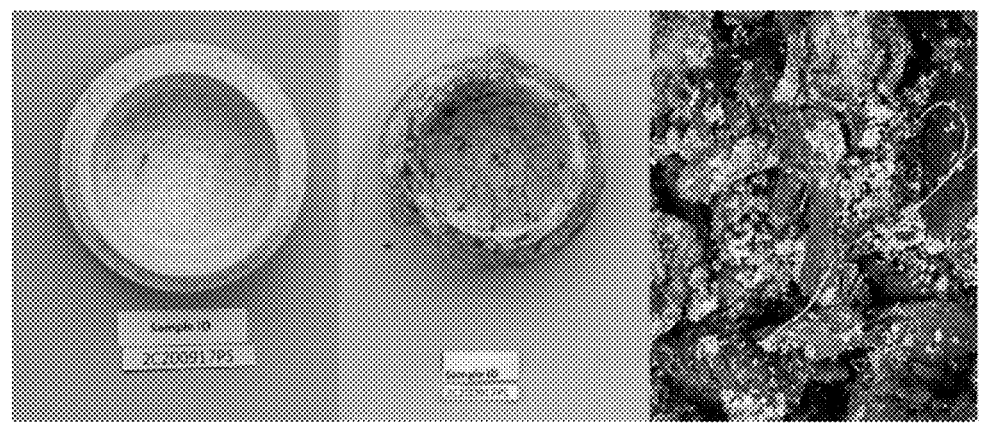
FIGS. 3A, 3B and 3C show photographs depicting the degradation of sample Com-2 in an industrial compost.

FIG. 3 shows photographs depicting the degradation of sample Com-2 in an industrial compost.

The results show that the wood composite jars with thick walls (max. 8 mm) made from the present material meet the EN 13432 standard requirements for disintegration and volatile solid content. This can be considered a vast improvement when compared to previous compostability results of existing PLA based blends with maximum wall thickness of 1.2 mm passing the standard requirements.

The properties of the present jars made from PLA/wood blend (in the following referred to by the abbreviation "Sula") meet the quality requirements of cosmetic packaging and provide greatly improved compostability over existing PLA-based blends. This is achieved by the combination of specifically sized wood chips with the biodegradable polyester matrix. The swelling of the wood particles during water absorption accelerates the cracking and fragmentation of the polymer matrix. Yet, the wood particles are small enough to produce sufficient mechanical, physical and chemical properties for the jar that support its use as a cosmetic packaging. Smaller particles, i.e., saw dust would not enhance compostability via water absorption and swelling as efficiently whereas larger particles would cause hindrances in the manufacturing process and would fasten the degradation too much.

In in-house tests at normal room temperature and pressure conditions, jars were filled with water and influence of weight increase to the disintegration, swelling and aestheticism of the jar was followed (Table 2). Each sample set comprised of three jars.

Figure 4:
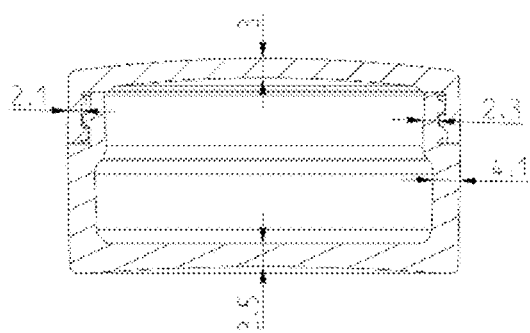
FIG. 4 shows the cross-section of a jar used in water absorption tests.

The schematic presentation of the jar used in water intake tests is presented in FIG. 4 which shows the cross-section of a jar used in water intake tests.

As will appear, the jar comprises of a bottom and a cap part. Bottom thickness is 3.5 mm, wall thickness is 4.1 mm and 2.3 mm on the thread section. Interior surface area for the above studied jar is around 40 cm$^2$.

TABLE 2

Recipes of the tested wood composite containers.

| | |
|---|---|
| Sample 1 | 100 w-% PLA |
| Sample 2 | 90 w-% PLA + 10 w-% wood chips (sieved size 1-2 mm) |
| Sample 3 | 80 w-% PLA + 20 w-% wood chips (sieved size 1-2 mm) |
| Sample 4 | 70 w-% PLA + 30 w-% wood chips (sieved size 1-2 mm) |
| Sample 5 | 60 w-% PLA + 40 w-% wood chips (sieved size 1-2 mm) |
| Sample 6 | 60 w-% PLA + 40 w-% wood chips (sieved size 0-1 mm) |
| Sample 7 | 60 w-% PLA + 40 w-% wood chips (compounded pellets) |

Pure PLA jar (Sample 1) water intake during a one-month period was only 0.4 w-%. Neither physical nor aesthetic changes in the jar were detected. When the jar contained 10 w-% wood chips water intake increased slowly to a level of 1 w-% and ceased there during one-month period. Jar having 40 w-% wood chips water intake increased to the level of 5 w-% causing strong dimensional changes and jars were leaking through the bottom. Even though jar was full of cracks it remained as a one piece. Surprisingly, samples containing 40 w-% wood chips having sieved size between 0 and 1 mm absorbed water only 3 w-% without changes in appearance.

The tests clearly indicate that pure PLA jars will neither biodegrade nor disintegrate within a few months at the room temperature. The amount of the wood chips and chip size has a crucial influence on the degrading properties of the herein studied jar products.

When wood weight percentage of the jar material is below 30 w-%, the water intake is very slow and remains below 3 w-% within 30 days period. Similar phenomenon was detected when saw dust was used as a filler material (Sample 6). Even when the jar contained 40 w-% of wood, no disintegration was detected. Saw dust is not capable for sufficient swelling which can break PLA matrix around wood chips. Also, the jars manufactured of compounded pellets containing 40 w-% wood revealed lower water intake by 1 percentage point in comparison with sample 5 manufactured of non-compounded wood. The lower water absorption of the compounded jars is related to wood chips size reduction during extrusion based compounding process. It is worth mentioning that compounding has no influence on the properties of PLA, e.g., molar mass values.

Figure 5:
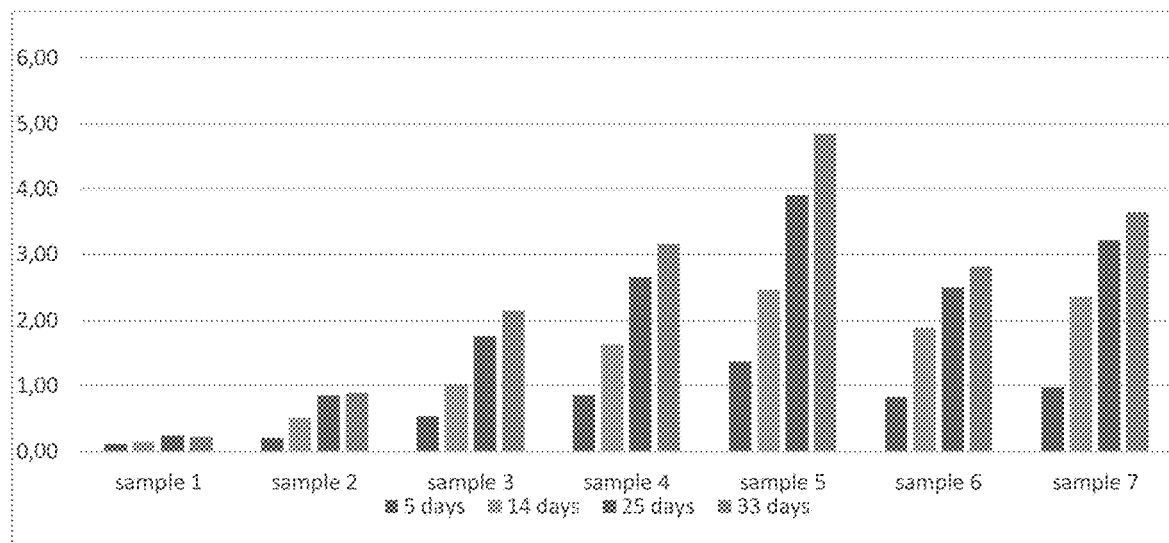
FIG. 5 is a bar chart showing the water absorption of the tested jars in weight percentages at 22° C. carried out test.

FIG. 5 shows water absorption of the jars in weight percentages

Water absorption value for sample set 5 (wood 40 w-%) was 1.5 g/33 days/40 cm$^2$→1.13 mg/(day·cm$^2$) and for sample set 3 (wood 20 w-%) the corresponding value was 1.09 g/33 days/40 cm$^2$→0.82 mg/(day·cm$^2$). For pure PLA absorption value was only 0.08 g/33 days/40 cm$^2$→0.061 mg/(day·cm$^2$).

The above mentioned test at room temperature was also carried out at 50° C. which mimic the industrial composting conditions. Water intake increased in pure PLA jar from 0.11 to 0.5 when temperature was increased from 22 to 50° C. Water intake was four times faster at elevated temperature. The increases in water absorption of the wood containing jars were slightly lower, being 3.5 faster.

Figure 6:
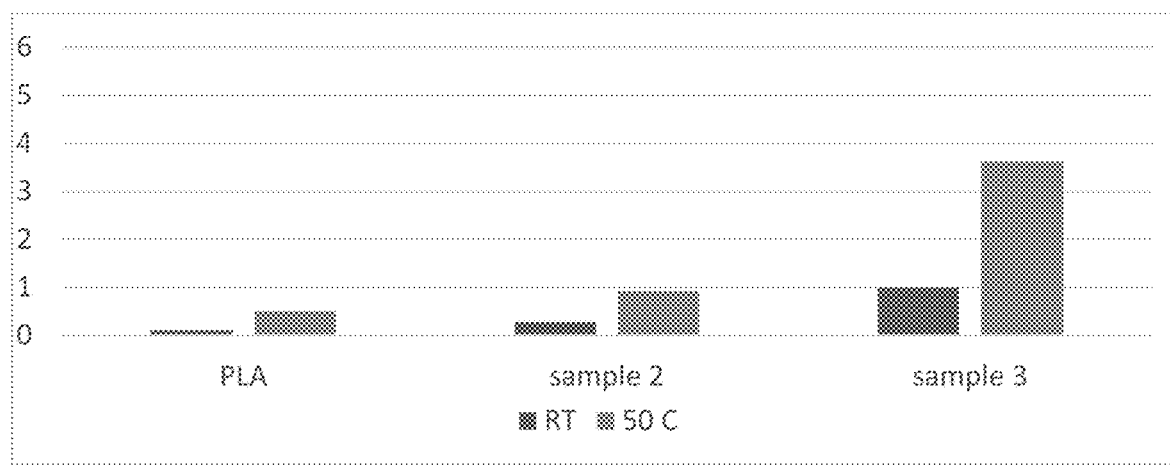
FIG. 6 is a bar chart showing the water intake in weight percentage of the jars during one week.

FIG. 6 is a bar chart showing the water intake in weight percentage of the jars during one week study period.

Rough extrapolation of water intake percentage for a 12 weeks' time period, based on the above results, indicates that at 50° C. water intake of a jar consisting of pure PLA is around 6 w-% and for a jar containing 10 w-% wood, the intake is around 11 w-%. The estimated water intake for jars containing 30 w-% wood is already as much as 43%. In our in-house tests jars that absorbed 15 w-% water remained in one piece.

Overall migration tests were used to study by filling methods according to EN 1186-9 and EN 1186-14 how inert the materials were in contact with different simulants. Aqueous simulants such as 10% ethanol, 3% acetic acid and 50% ethanol were used, of which acetic acid simulates conditions with a pH of less than 4.5, and 50% ethanol simulates partly lipophilic conditions such as water-oil emulsions. To substitute vegetable oil, non-polar solvents was used to simulate fatty foodstuffs, i.e., 95% ethanol and iso-octane, were used. The test conditions selected were 10 days at 40° C. (except for iso-octane 2 days at 20° C.), which corresponds to any long term storage at room temperature or below, including heating up to 70° C. for up to 2 hours, or heating up to 100° C. for up to 15 minutes. According to Regulation (EC) 10/2011 on plastic materials intended for food contact, overall migration should not exceed 10 mg/dm$^2$.

The results in FIG. 6 demonstrate that jars made of plain PLA are inert under the tested conditions in contact with all of the simulants. Wood composites with 10-20 wt % wood (Sula10 and Sula20) were nearly as inert as PLA in contact with all of the simulants. The composite with 30 wt % wood (Sula30) showed only a slight reaction with emulsion simulant 50% ethanol, whereas composite with 40 wt % wood (Sula40) demonstrated increased reactivity with all aqueous simulants, specifically with 50% ethanol and 3% acetic acid.

Sample cups with a layered wall structure were manufactured using two-component (2K) injection molding. Both sandwich and two-wall methods were used.

In one embodiment, using the sandwich method a wall with three layers was produced, wherein the outermost and innermost layers were of the same material, sealing between them a layer of a second material. In this case, the outer and innermost layers were of PLA and the middle layer between them was of wood composite (in the specific examples "Sula20" and "Sula30", respectively. Hence, the wood composite layer was fully enclosed by a layer of PLA from all sides. In one embodiment of the sandwich method, the PLA layer had a thickness of 0.5 to 1 mm, in particular approximately 0.8 mm.

In the two-wall method only two layers were produced, with a PLA layer inside the cup, and a wood composite layer on the outside. This method yielded thicker layers and in this particular case the thickness of the PLA layer was approximately 1 mm.

As will appear from Table 3, both methods were successfully used to restore the inertness comparable to plain PLA with all the simulants. Both layer thicknesses were as effective in this case.

TABLE 3

Overall migration results

| Sample | Water-like 10% EtOH mg/dm$^2$ | Low pH 3% Acetic acid mg/dm$^2$ | Emulsion 50% EtOH mg/dm$^2$ | Oil simulants 95% EtOH mg/dm$^2$ | Iso-octane mg/dm$^2$ |
|---|---|---|---|---|---|
| PLA | <2 | <2 | <2 | <2 | <2 |
| Sula10 | <2 | <2 | <2 | 2.3 | <2 |
| Sula20 | <2 | <2 | 2.6 | 3.0 | <2 |
| Sula30 | 3.6 | 3.2 | 6.5 | 3.9 | <2 |
| Sula40 | 6.5 | 11.4 | 16.6 | 6.7 | <2 |
| PLA-Sula20-PLA | <2 | <2 | <2 | <2 | <2 |
| PLA-Sula30-PLA | <2 | <2 | <2 | <2 | <2 |
| Sula40 outside-PLA inside (thicker) | <2 | <2 | <2 | <2 | <2 |

Based on the migration results and microscope images of the Sula40 material surface (FIG. 7), it was concluded that the inertness of the materials is greatly affected by the exposure of wood particles on the surface. When there is no protective layer of polymer on top of the wood particle, the particle is directly exposed to simulants and prone to moisture intrusion. The proportion of wood particles exposed at the surface directly affects the absorption behavior of the material, as shown by the migration data: higher wood content leads to higher absorption. However, a protective layer of 0.8 mm PLA on top of the wood composite layer was shown to reduce the absorption.

In the current invention, the balance of biodegradation and inertness is regulated by the surface exposure of wood particles versus protective PLA layer on the surface.

Figure 7A:
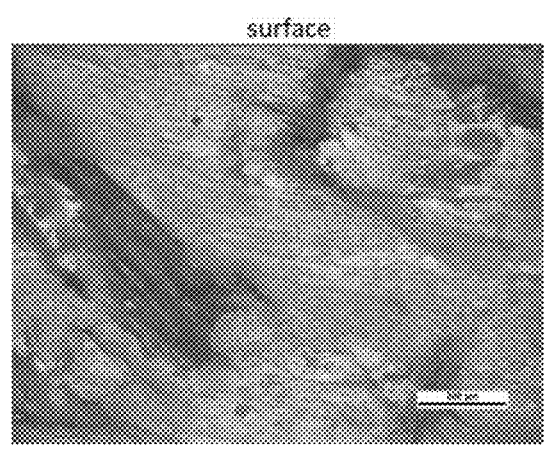
FIGS. 7A and 7B are micrographic images of the Sula40 wood composite sample, FIG. 7A showing the surface and FIG. 7B the cross-section after being in contact with Oil Red O stained water for 94 days at 23° C.
Figure 7B:
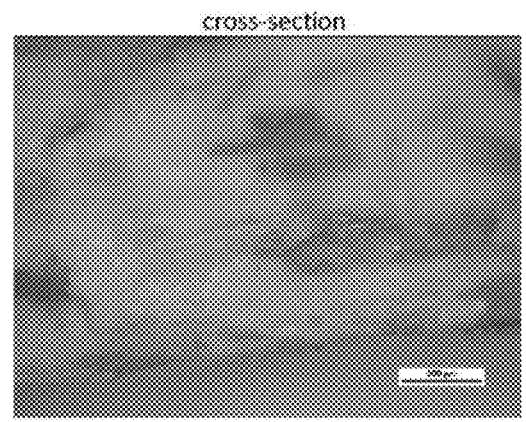

FIGS. 7A and 7B are microscope images of the Sula40 wood composite sample, FIG. 7A showing the surface and FIG. 7B the cross-section after being in contact with Oil Red O stained water for 94 days at 23° C.

The images show that wood particles are exposed on the surface (stained red). The cross-section image shows that only the wood particles on the surface have stained red in contact with stained water, whereas the wood particles inside the wall have not absorbed the stained water.

Surface smoothness of the jar product influence significantly into to the water absorption and degrading rate of the composite material. Any treatment to the composite surface, e.g., plasma, which is traditionally used for improving adhesion between coating and core material increased water absorption level to 1.66 mg mg/(day·cm$^2$) resulting in water penetration through the jars within 2 weeks.

Five jars manufactured as explained above, but having wood content of 0 to 40% by weight and in one case further containing white pigment (PCC), were analyzed for surface smoothness.

The smoothness of the surfaces were determined pursuant to ISO 4287 using a Wyko NT9100 Optical Profiling System.

The surface roughness values of the tested materials were obtained when mould temperature was less than 50° C.

The VDI roughness values of the mould itself being between 20 and 30 which corresponds to between 1 and 3 micrometers (Ra).

Figure 8:
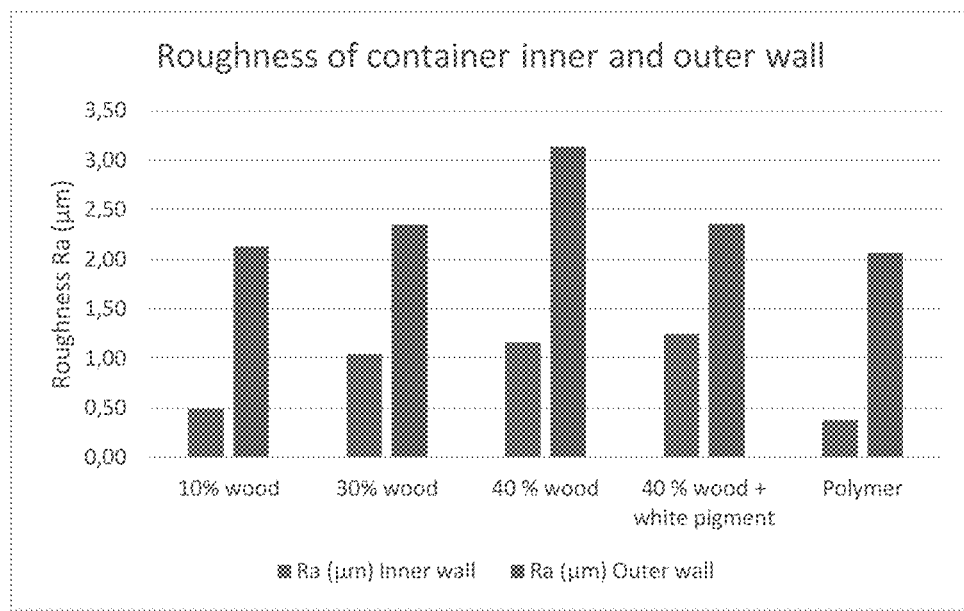
FIG. 8 is a bar chart showing roughness of the inner and outer walls of containers made by injection moulding using composited having various wood particle content.
Figure 9A:
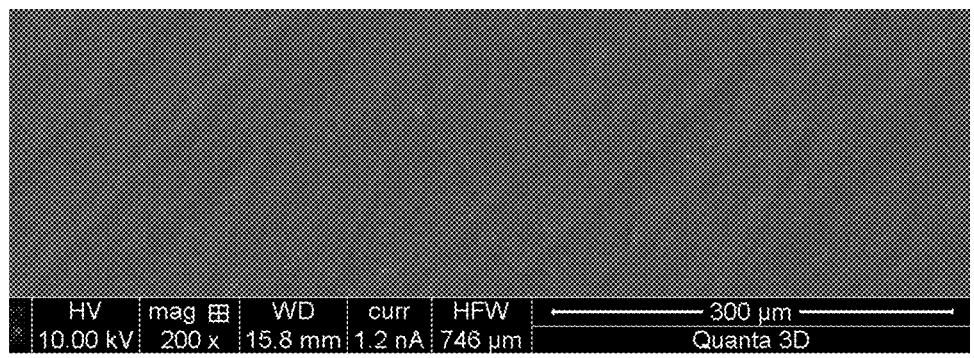
Figure 9B:
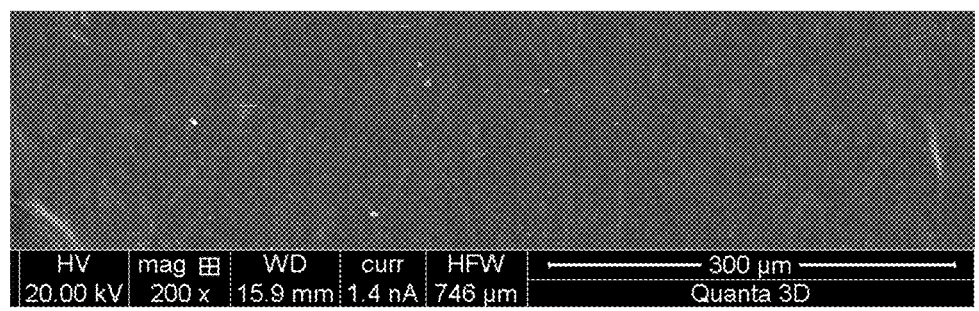
Figure 9C:
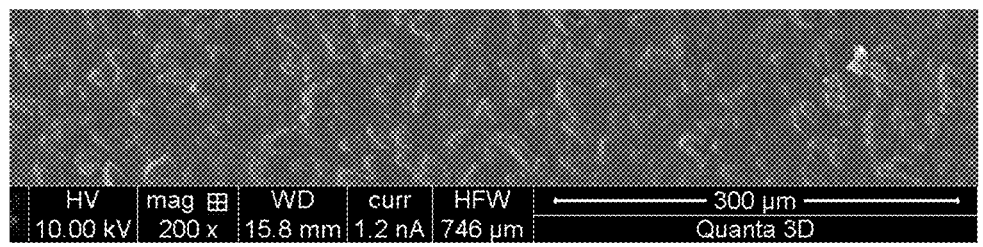
Figure 9D:
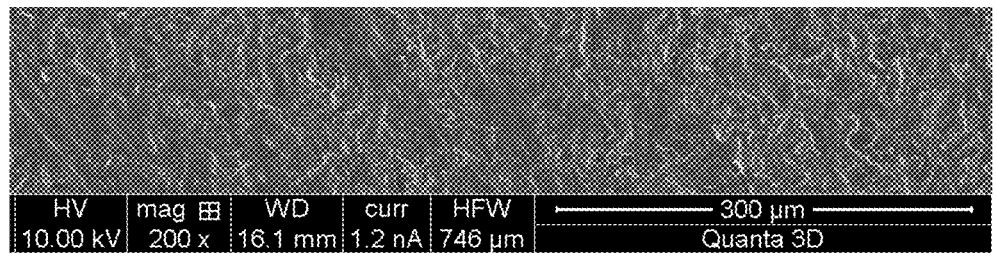

The results are shown in FIG. 8 and the surfaces of the various sample are shown by way of SEM micrographs in FIGS. 9A to 9D.

As will appear from the bar charts of FIG. 8, for a neat PLA polymer, the roughness of the inner surface ("inside") of the container was about 0.35 μm and about 2.05 μm on the outer surface ("outside"). These values reflect the corresponding roughness values of the mold. The surface of the mold matching the outer surface of the jar has been For wood-PLA composites the roughness will increase depending on the wood content. This appears from the three first pairs of bars. For 10% of wood particles, calculated from the total weight of the wood-PLA composite, there is but a minor increase to more than 0.4 μm on the inside and 2.1 μm on the outside. For 30% wood, the roughness is already in excess of 1 μm on the inside and more than 2.3 μm on the outside. For 40% wood, the roughness on the inside is about 1.2 μm and on the outside about 3.15 μm. By adding about 5% of PCC, the roughness on the outside can be somewhat reduced, as will appear from the fourth pair of bars. Thus, the inside roughness is about 1.25 μm but the outside roughness about 2.3 μm.

The micrographs of FIGS. 9A to 9D shows how the texture of the surface of the inner surface changes depending on the wood content (content of wood particles).

During composting, fast water absorption rate is a beneficial feature but not when, e.g., cosmetic products need to be stored in the jar for 12 months prior use. The migration results for 50 w-% ethanol revealed interestingly that a thin layer of polymer on the surface of the jar reduced migrations to an approvable level (Table 3). The same result was achieved when wood content in the composite was reduced to 30 w-%. The wood chips in the jar containing 40 w-% wood are in the proximity of the surface and when in direct contact with liquids chips start swelling within a few weeks leading to formation of microcracks and eventually fast degradation of the jar. Further on, when wood content is reduced, or size of the wood chips is too small, swelling cause only minor cracking in the polymer matrix and no structural disintegration can take place.

Based on the results of the roughness testing, and in view of the decomposition test carried out, it can be concluded according to the test embodiments that when the surface roughness values are in excess of 0.4 for the inner surface of the container and in excess of 2.0 μm for the outer surface of the container, the jar comprised of the present wood-PLA composites will fulfill the requirements for compostability.

In the following, some embodiments of the present technology are disclosed:

1. Compostable wood composite material formed by a first layer of a compostable material comprising in combination a biodegradable polymer which forms a continuous matrix and mixed therein particles of a hydrophilic material capable of swelling inside the matrix upon water absorption, and a second layer of a compostable material comprising a biodegradable polymer which forms a continuous matrix and which is free or essentially free from particles of a hydrophilic material capable of swelling inside the matrix, or which contains essentially less of them than the first layer.
2. The material according to embodiment 1, wherein the particles of a hydrophilic material capable of swelling inside the matrix upon water absorption are selected from particles obtained by mechanically processing of wood or other lignocellulosic materials, such as annual or perennial plants and plant residues.
3. The material according to embodiment 1 or 2, wherein the thickness of the first layer is greater than the thickness of the second layer, in particular the ratio between the thickness of the first layer to the thickness of the second layer is about 1.1:1 to 100:1 for example 1.2:1 to 10:1.
4. The material according to any of embodiments 1 to 3, wherein the first layer comprises from 5 to 50 wt %, in particular 15 to 40 wt % of particles of a hydrophilic material, calculated on the basis of the total weight of the first layer.
5. The material according to any of embodiments 1 to 4, wherein the biodegradable polymer of at least one of the first layer, the second layer and the third layer(s) is selected from the group of biodegradable polyesters, such as polyesters, including polylactide and poly (lactic acid), polyglycolide and poly(glycolic acid), cellulose acetate propionate, or polyhydroxyalkanoate, e.g., polyhydroxybutyrate.
6. The material according to any of embodiments 1 to 5, which meets the following specification: in compost, biodegradation of the material at 58° C. takes place within a maximum period of time of 6 months, the level of biodegradation reached being a 90% level of the total weight of the layers, and disintegration of the layers at 58° C. occurring within 12 weeks.
7. The material according to any of embodiments 1 to 6, wherein the first layer comprises coarse wood particles mixed with biodegradable thermoplastic, the water content of the wood particles, for example wood chips, having been reduced to below 250 ppm, for example to below 50 ppm, in particular to below 30 ppm, before mixing with the biodegradable thermoplastic.
8. The material according to any of embodiments 1 to 7, shaped into a product, such as a layered product, having a thickness of more than 1 mm, in particular more than 1.2 mm, and up to 25 mm or even more, the layered product preferably being degradable at industrial composting conditions.

INDUSTRIAL APPLICABILITY

The present articles can be used as packaging and containers, such as jars with closing lids, for various materials, including aqueous and oleaginous products. Such products are exemplified by foodstuffs, cosmetics and pharmaceuticals, in particular foodstuffs, cosmetics and pharmaceuticals, containing or consisting of oils, emulsions, creams and gels.

The present articles are also suitable for storing or serving of sugar-containing natural or cooked products, such as honey and jam. They can further be used for dry substances, e.g. provided in the form of powders or dried natural or cooked or otherwise prepared materials, such as milk powder (condensed milk, powdered milk), dried fruits, soups, meat and fish, as well as spices and tea, cocoa and coffee, to mention a few.

CITATIONS LIST

Patent Literature

U.S. Pat. No. 8,722,773B1
JP 2002113822
WO 2015/048589A1
CN 101712804 A
US 2013/253112A1
US 2016/076014A1
US 2002/130439A1
EP 0 319 589 A
US 2018/215972A1
CN 107932874A
JP 2010280152
US 20060267238A1
U.S. Pat. No. 6,210,792B1
U.S. Pat. No. 6,632,863B2
CA 1171656A
WO 2015/048589A1

Non-Patent Literature

Kale, G., Kijchavengkul, T., Auras, R., Rubino, M., Selke, S. E., Singh S. P. "Compostability of Bioplastic Packaging Materials: An Overview." *Macromolecular Bioscience* 7 (2007), 255-277.

The invention claimed is:
1. A container comprising a wall, the wall comprising:
a first layer of a compostable material, the compostable material comprising a biodegradable polymer which forms a continuous matrix and mixed therein particles of a hydrophilic material configured to swell inside the continuous matrix upon water absorption, wherein the first layer comprises from 5 to 50 wt % of the particles of a hydrophilic material calculated on the basis of the total weight of the first layer, wherein the biodegradable polymer of the first layer comprises a member selected from the group consisting of polylactide, poly (lactic acid), polyglycolide, poly (glycolic acid), cellulose acetate propionate, and polyhydroxyalkanoate, and
a second layer of a compostable material comprising a biodegradable polymer which forms a continuous matrix and which comprises particles of a hydrophilic material configured to swell inside the matrix upon water absorption of less than 50% of the wt % of the particles of a hydrophilic material in the first layer, wherein the biodegradable polymer of the second layer is selected from the group consisting of polylactide, poly (lactic acid), polyglycolide, poly (glycolic acid), cellulose acetate propionate, and polyhydroxyalkanoate.
2. The container according to claim 1, wherein the particles of a hydrophilic material configured to swell inside the matrix upon water absorption are selected from particles obtained by mechanically processing wood or other lignocellulosic materials.
3. The container according to claim 1, wherein the particles of a hydrophilic material are obtained by crushing, chipping, shaving, grinding or refining of natural materials.

4. The container according to claim 1, wherein the particles of a hydrophilic material comprise coarse wood particles having a screened size of at least 0.5 mm and 25 mm or less.

5. The container according to claim 1, wherein the wall has a total thickness of 1 mm to 25 mm.

6. The container according to claim 1, wherein the thickness of the first layer is greater than the thickness of the second layer.

7. The container according to claim 1, further comprising a third layer of a compostable material, the third layer comprising a matrix of a biodegradable polymer which is essentially free from the particles of a hydrophilic material configured to swell inside the matrix upon water absorption.

8. The container according to claim 7, wherein the container comprises a 3-layered wall defining a central cavity for receiving the content to be stored in the container, the cavity having an inner face formed by the second layer, an opposite layer formed by the first layer, and an outer layer on the opposite side of the first layer with respect to the cavity formed by the third layer.

9. The container according to claim 1, wherein the second layer comprises at least 90% by weight of a neat biodegradable polymer.

10. The container according to claim 1, wherein the second layer comprises up to 5% by weight, calculated from the total weight of the second layer, of one or more additives.

11. The container according to claim 1, wherein the container wall meets the following specification: in compost, biodegradation of the wall at 58° C. takes place within a maximum period of time of 6 months, the level of biodegradation reached being a 90% level of the total weight of the wall, and disintegration of the wall at 58° C. occurring within 12 weeks.

12. The container according to claim 1, wherein the container is in the shape of a jar with a closeable lid, and wherein the water absorption in a 45 ml jar is more than 0.061 mg/(day·cm$^2$) and less than 2.0 mg/(day·cm$^2$) within 33 days period at normal temperature and pressure (NTP).

13. The container according to claim 1, wherein the container comprises:
an overall migration level for 95 w-% ethanol is more than 2 mg/dm$^2$ but less than 10 mg/dm$^2$ for a wall containing wood between 10 and 40 w-%,
an overall migration level for 10 w-% ethanol is less than 10 mg/dm$^2$ for a wall containing wood between 10 and 40 w-%, and/or
an overall migration level for 50 w-% ethanol is less than 10 mg/dm$^2$ for a wall containing wood between 10 and 30 w-%.

14. The container according to claim 1, wherein the container comprises a 2-layered wall defining a central cavity for receiving content to be stored in the container, the cavity having an inner face formed by the second layer and an opposite layer formed by the first layer.

15. The container according to claim 1, wherein the first layer comprises coarse wood particles mixed with a biodegradable thermoplastic material, the water content of the wood particles having been reduced to below 250 ppm, before mixing with the biodegradable thermoplastic material.

16. The container according to claim 1, wherein the wall further comprises one or more additives selected from the group consisting of metal stearates, maleic anhydride grafted thermoplastics, oleamides, erucamides, fatty acids, waxes and lignins, dying materials, and mixtures thereof, said one or more additives being incorporated in an amount of up to 10 wt %.

17. The container according to claim 1, wherein the surface of the second layer is opposite to the first layer and has a surface roughness of less than 1 um as determined by ISO 4287.

18. The container according to claim 1, wherein the container comprises an inner and an outer surface, and wherein said inner surface has a roughness of 0.4 μm or more and said outer surface has a roughness value of 2.0 μm or more, as determined according to ISO 4287.

19. The container according to claim 1, further comprising an aqueous and oleaginous product within the container.

20. The container according to claim 1, wherein the first layer comprises a plurality of first layers and the second layer comprises a plurality of second layers, and wherein the plurality of the first layers and second layers are disposed in an overlapping arrangement relative to one another to form a multi-layered wall structure.

21. The container according to claim 1, wherein the particles of a hydrophilic material comprise wood particles having a screened size of from 1 mm to 25 mm.

22. The container according to claim 1, wherein the first layer comprises from 5 wt % to 50 wt % of the particles of a hydrophilic material configured to swell inside the continuous matrix upon water absorption, calculated on the basis of the total weight of the first layer, and wherein the second layer comprises from 5 wt % to less than 50 wt % of the particles of a hydrophilic material configured to swell inside the matrix upon water absorption, calculated on the basis of the total weight of the second layer.

23. The container according to claim 1, wherein the particles of a hydrophilic material comprise coarse wood particles having a screened size of at least 5 mm to 25 mm or less.

24. The container according to claim 1, wherein each of the first layer and the second layer comprise the particles of a hydrophilic material, and wherein the wt-% of the particles of a hydrophilic material in the second layer is less than 25% of the wt-% of the particles of a hydrophilic material in the first layer.

25. The container according to claim 1, wherein the wall is seamless.

26. A method of producing the container of claim 1, the method comprising:
forming a first mixture comprising a biodegradable polymer which forms a continuous matrix and mixed therein particles of a hydrophilic material configured to swell inside the matrix upon water absorption, wherein the biodegradable polymer of the first mixture comprises a member selected from the group consisting of polylactide, poly (lactic acid), polyglycolide, poly (glycolic acid), cellulose acetate propionate, and polyhydroxyalkanoate;
forming a second mixture comprising a biodegradable polymer which forms a continuous matrix and which contains fewer of the particles of a hydrophilic material configured to swell inside the matrix upon water absorption; and
processing said first and said second mixtures by injection molding to form a container wall comprising layers of said first and said second mixtures in overlapping arrangement.

* * * * *